Dec. 13, 1966  A. A. TINAJERO  3,291,242
COMBINED VTOL AIRCRAFT AND GROUND EFFECTS MACHINE
Filed April 23, 1965  2 Sheets-Sheet 1

INVENTOR
ANIBAL A. TINAJERO

BY
Claude Funkhouser
ATTORNEY
Stanley N. Garber
AGENT

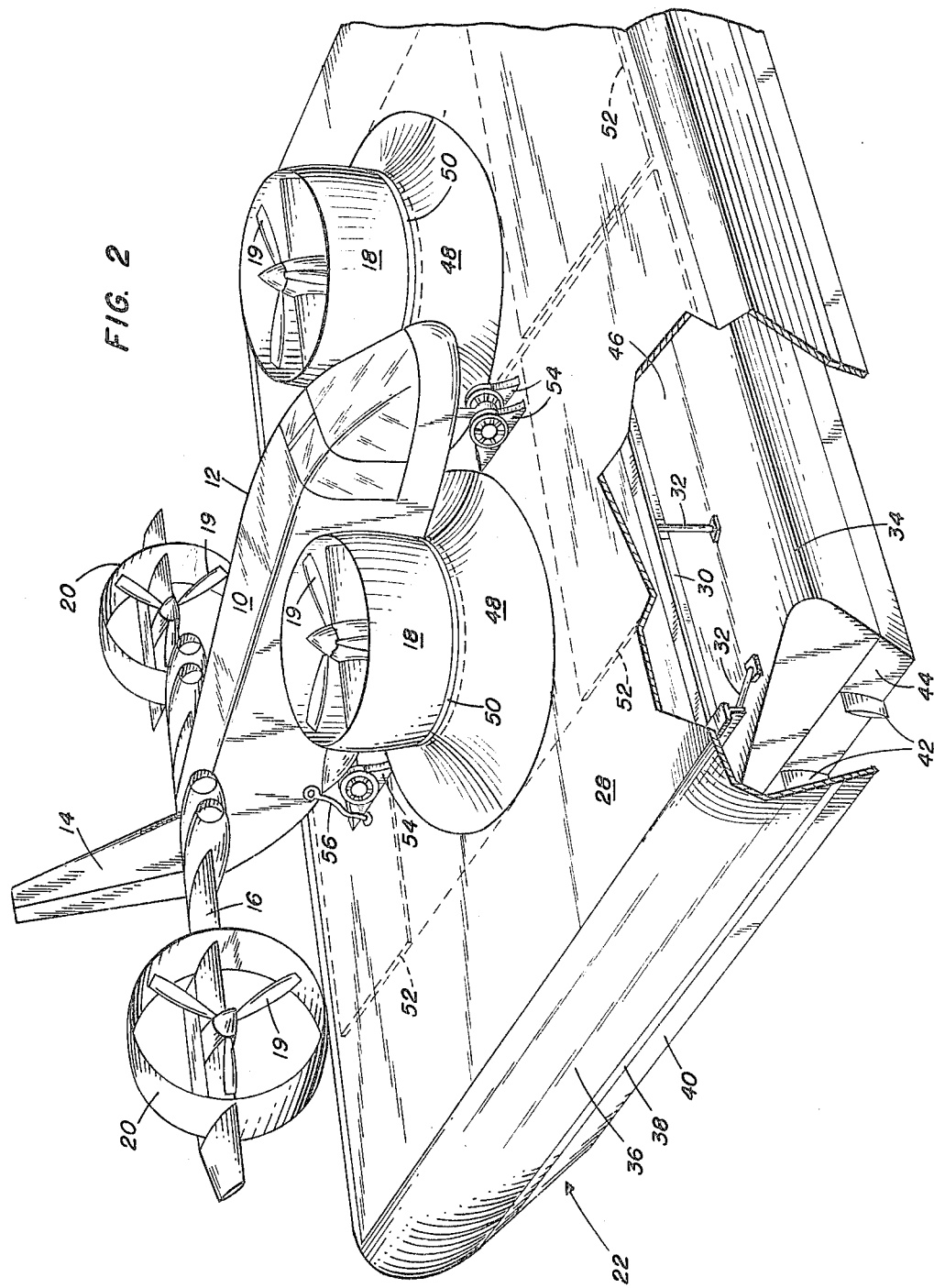

United States Patent Office 3,291,242
Patented Dec. 13, 1966

3,291,242
COMBINED VTOL AIRCRAFT AND GROUND EFFECTS MACHINE
Anibal A. Tinajero, Arlington, Va., assignor to the United States of America as represented by the Secretary of the Navy
Filed Apr. 23, 1965, Ser. No. 450,555
6 Claims. (Cl. 180—7)

The invention described herein may be manufactured and used by or for the Government of the United States of America for governmental purposes without the payment of any royalties thereon or therefor.

The present invention relates to ground effect vehicles and more particularly to a landing platform of the ground effects machine type for vertical takeoff and landing aircraft.

One of the more critical problems confronting designers of vertical take-off and landing (VTOL) aircraft has been the inability of such aircraft to maneuver for sustained periods of time on or near the surface of the ground. This problem is due, in a large part, to two inherent characteristics of such aircraft. The first is the increased amount of fuel necessary to sustain vertical flight. This is due to the increased thrust that the engines must develop while the aircraft is in vertical flight in order to compensate for the loss of lifting force which normally is provided by the aircraft wings when the aircraft is in horizontal flight. The second inherent characteristic of VTOL aircraft is its instability and lack of precise control when maneuvering on or near the surface of the ground.

The present invention overcomes these limitations by providing a mobile landing platform for a VTOL aircraft which is highly maneuverable and which is capable of maintaining large stores of fuel for extending the aircraft's operational time when maneuvering on or near the surface of the ground. Briefly, this landing platform comprises an unpowered ground effects machine (GEM) having means for securing the VTOL aircraft's engines thereto for powering same in a ground effects manner.

The general purpose of this invention, therefore, is to provide an unpowered GEM landing platform for VTOL aircraft, which landing platform increases the range and maneuverability of such aircraft while providing ground effects operation at minimal additional cost and complexity.

Accordingly, an object of the present invention is the provision of an unpowered GEM.

Another object is to provide an unpowered GEM landing platform for VTOL aircraft.

A further object of the invention is the provision of an unpowered GEM landing platform for VTOL aircraft which increases the range and maneuverability of such aircraft when operating on or near the surface of the ground.

Still another object is to provide a GEM support vehicle which increases the useful payload of VTOL aircraft.

Yet another object of the present invention is the provision of an unpowered GEM landing platform for VTOL aircraft which is characterized by simplicity of construction, low cost and ease of operation and use.

Other objects and many of the attendant advantages of this invention will be readily appreciated as the same becomes better understood by reference to the following detailed description when considered in connection with the accompanying drawings in which:

FIG. 2 is a perspective view, partly broken away, of a combined VTOL aircraft and GEM.

Figure 1A:
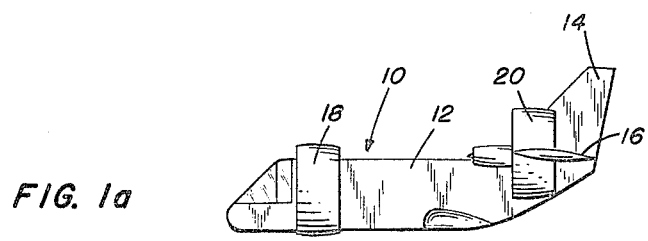
FIG. 1a is a diagrammatic view of a VTOL aircraft in horizontal flight.
Figure 1B:
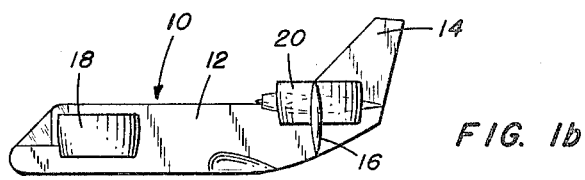
FIG. 1b is a diagrammatic view of a VTOL aircraft in vertical flight.

Referring now to the drawings wherein like reference characters designate like or corresponding parts throughout the several views, there is shown in FIGS. 1a and 1b a VTOL aircraft 10 in horizontal and vertical flight, respectively. The aircraft 10 comprises a fuselage 12, a vertical stabilizer 14, a wing 16, a pair of forward engine ducts 18 and a pair of aft engine ducts 20. Within each of the ducts 18, 20, a propeller 19, driven by suitable engines, is provides for powering the aircraft. When the VTOL aircraft 10 is in horizontal flight, as illustrated in FIG. 1a, the axes of both of the engine ducts 18 and 20 are disposed in a horizontal plane similar to a conventional aircraft. When, however, the VTOL aircraft 10 is in vertical flight, as illustrated in FIG. 1b, the engine ducts 18 and 20 are rotated about a horizontal axis so that the axes of both of the engine ducts 18, 20 are in a vertical plane similar to a conventional helicopter. The VTOL aircraft 10 described thus far is of conventional construction and is operated in a conventional manner.

Figure 1C:
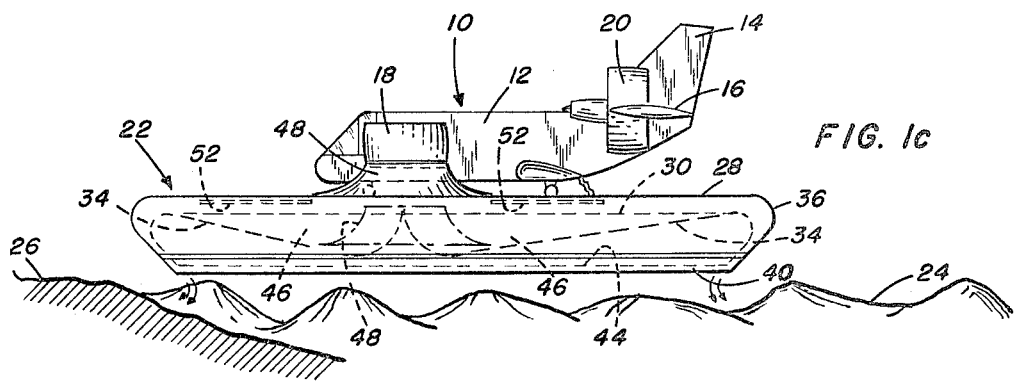
FIG. 1c is a diagrammatic view of a combined VTOL aircraft and GEM with the internal details thereof shown in phantom.

As shown in FIG. 1c, the VTOL aircraft 10 is secured to the GEM landing platform 22 for providing the power to support and move the GEM 22 over either the surface of the water 24 or land 26.

As best illustrated in FIG. 2, the GEM landing platform 22 is of the peripheral jet type and is comprised of a landing deck 28 secured to a frame 30 which is supported by strut members 32 from the upper surface of the flotation tanks 34. The flotation tanks 34 may be partitioned off and utilized as either storage tanks for aircraft fuel, or the like, or as flotation means for maintaining the GEM 22 afloat if there is a power failure when used over a water environment.

The GEM landing platform 22 further comprises a peripheral flexible outer wall 36 having a stiffener member 38 and a flexible skirt member 40 secured thereto. A plurality of vane stiffeners 42 are secured to a lower frame member 44 for maintaining the outer wall 36 and the flexible skirt 40 properly spaced from the tanks 34. As shown in FIG. 1c, a plenum chamber 46 is thus formed between the tanks 34 and the landing deck 28.

Referring now to FIG. 2, a pair of retractable flared duct sleeves 48 are disposed adjacent the engine ducts 18 shown substantially above the top surface of platform 22, for confining the downward flow and for receiving the discharge from the ducts 18. Duct sleeve sealing gaskets 50, preferably formed of a spongy rubber material, are provided around the periphery of the upper lip of the duct sleeves 48 for sealing the engine ducts 18 thereto. In addition, means are provided for retracting the duct sleeves 48 below the surface of the landing deck 28 so that a smooth, unobstructed platform is provided for landing the VTOL aircraft 10.

More particularly, a pair of plates 52 are slidably mounted beneath the landing deck 28 adjacent each duct sleeve 48. Suitable actuators (not shown) are provided for sliding the plates 52 into an open or a closed position. When in an open position, as illustrated, the duct sleeves 48 may be raised through openings provided in the deck 28 so that the engine ducts 18 of the VTOL aircraft 10 can be secured thereto for providing power for the GEM 22. When the duct sleeves 48 are lowered, as shown in phantom in FIG. 1c, the plates 52 may be slid together thereby covering the ducts 48 and providing a smooth, unobstructed platform 28.

Conventional landing gear locking means, such as blocks 54, may be utilized to secure the aircraft 10 to the landing deck 28. In addition, a quick disconnect fuel hose 56 is provided for supplying the VTOL aircraft 10 with fuel from the storage tanks 34 either when the aircraft is powering the GEM 22 or when it is desired to refuel the aircraft.

In operation, the VTOL aircraft 10 is operated in a conventional manner as illustrated in FIG. 1a until it is desired to land, whereupon, as shown in FIG. 1b, the engine ducts 18 and 20 are rotated to permit the aircraft 10 to descend vertically and land on the GEM 22. Once the aircraft 10 has landed on the GEM 22, it is properly positioned on and secured to the landing deck 28 and the quick disconnect fuel line 56 is connected thereto. The plates 52 on the GEM 22 are then slid to an open position and the duct sleeves 48 are raised until they engage the lower lips of the engine casings 18. The combined VTOL aircraft 10 and GEM 22 then can be used in a ground effects manner over any suitable terrain with the aft engines 20 providing forward thrust. Control of the combined unit may be achieved either by conventional GEM techniques, such as movement of the flexible skirt 40, or by utilizing the control surfaces on the VTOL aircraft 10. For example, by providing differential thrust of the aft engines 20 and deflection of the rudder portion of the vertical stabilizer 14, the combined unit can be steered in any desired direction.

When the VTOL aircraft 10 is ready to take-off, the landing gear securing means 54 are removed and the fuel line 56 is disconnected. The duct sleeves 48 are then retracted into the plenum chamber 46 and the plates 52 are slid together to close the opening formed by the withdrawal of the ducts 48. The aft engines 20 are then rotated to a vertical position and the aircraft 10 is then ready for take-off. After the aircraft 10 becomes airborne, the engine ducts 18 and 20 are gradually rotated to a horizontal position whereupon the aircraft 10 may assume normal horizontal flight.

It is to be understood, of course, that the foregoing disclosure relates to a preferred embodiment of the invention and that many modifications or alterations may be made therein without departing from the spirit and scope of the invention as set forth in the appended claims. For example, any suitable VTOL aircraft may be utilized with only minor modifications being necessary to the GEM 22.

What is claimed is:
1. A landing platform for a VTOL aircraft comprising an unpowered ground effects machine, said ground effects machine having downward lift flow confining means disposed substantially above the top surface of said ground effects machine adapted to be secured to the engine ducts of a VTOL aircraft for receiving the discharge therefrom and for powering said ground effects machine from the discharge of said ducts.

2. A landing platform in accordance with claim 1 wherein
said ground effects machine is of the peripheral jet type.

3. A landing platform in accordance with claim 1 wherein
said means comprises a retractable flared duct sleeve having engine duct sealing means disposed around the upper lip thereof.

4. A landing platform in accordance with claim 3 wherein said ground effects machine comprises
a substantially flat landing deck having an opening therethrough for said duct sleeve;
tank means disposed below said landing deck for normally providing flotation means for said platform;
strut means supporting said landing deck from the upper surface of said tank means; and
an outer wall extending around the periphery of said landing deck, whereby a plenum chamber is formed between said landing deck and said tank means.

5. A landing platform in accordance with claim 4 comprising
means slidably mounted below said landing deck for closing said opening when said duct sleeve is in a retracted position.

6. A landing platform in accordance with claim 4 wherein
a portion of said tank means is adapted to contain aircraft fuel; and
means for supplying fuel to the VTOL aircraft from said tank means when the VTOL aircraft is disposed on said landing deck.

References Cited by the Examiner
UNITED STATES PATENTS

| | | | |
|---|---|---|---|
| 3,112,904 | 12/1963 | Reams | 244—114 |
| 3,175,785 | 3/1965 | De Tore et al. | 244—17.11 |

MILTON BUCHLER, *Primary Examiner.*
LARRY C. HALL, *Examiner.*
P. E. SAUBERER, *Assistant Examiner.*